Oct. 7, 1941.  V. F. ZAHODIAKIN  2,258,039
HEAT TREATING AND DRAWING FIXTURE
Filed July 25, 1938
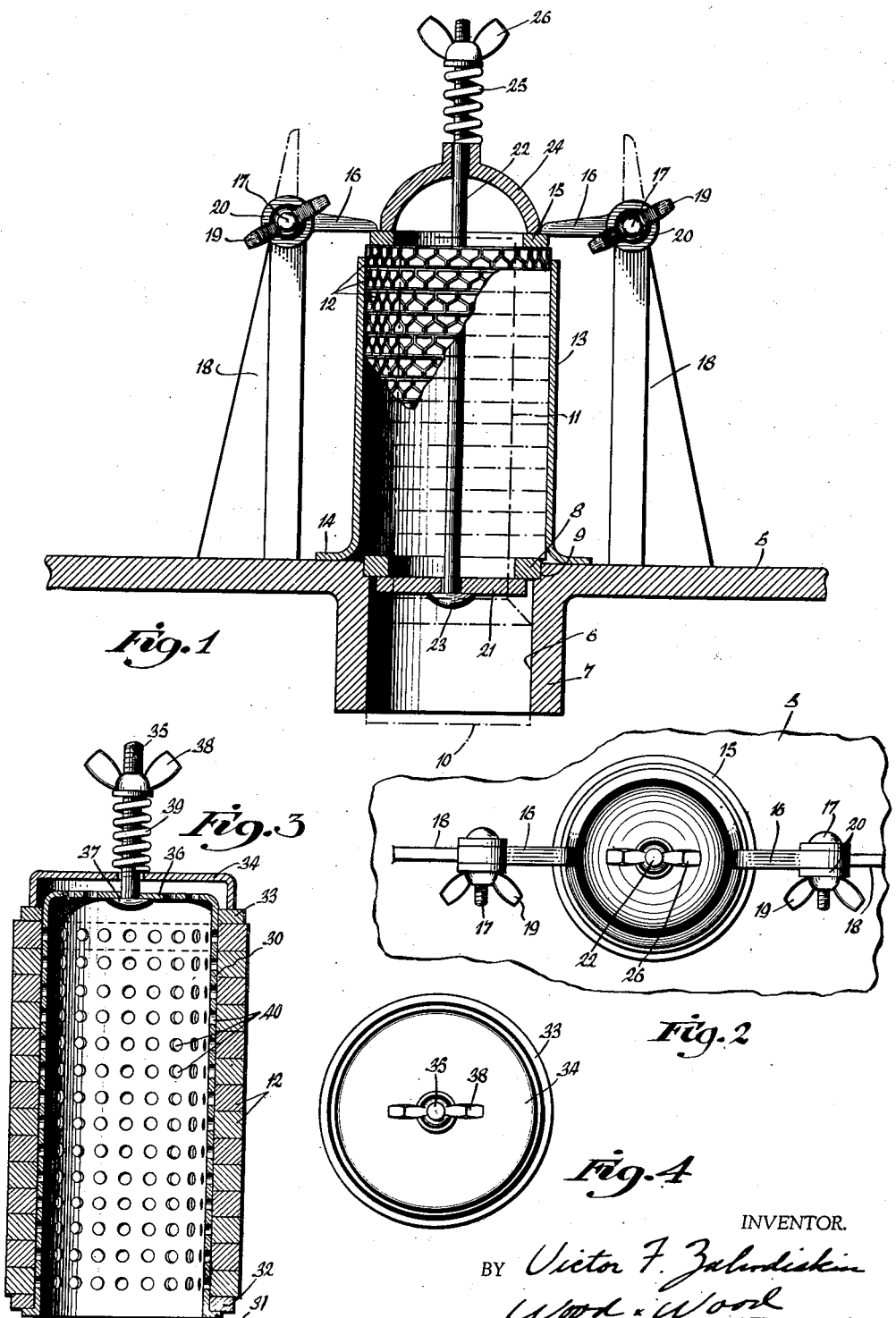
INVENTOR.
BY Victor F. Zahodiakin
Wood & Wood
ATTORNEYS Patented Oct. 7, 1941

2,258,039

UNITED STATES PATENT OFFICE 2,258,039

HEAT TREATING AND DRAWING FIXTURE

Victor F. Zahodiakin, New York, N. Y.

Application July 25, 1938, Serial No. 221,160

1 Claim. (Cl. 29—89)

This invention relates to the art of heat treating and drawing metal and is particularly directed to a fixture for supporting and holding a series of articles such as piston rings, during the process of heat treating and drawing.

In the operation of heat treating, quenching, and drawing a multiplicity of small articles, it is extremely difficult to so dispose the articles that they will not warp or assume shapes other than those intended in the finished form. Furthermore, it is extremely difficult to hold the articles in a group for the treatment in such manner that certain of the surfaces of the metal parts being treated are fully exposed for the treatment. Particularly does this difficulty arise in connection with the treatment of rings, such as piston rings, for it is highly desirable that the internal and external surfaces receive the treatment. Additionally, it is difficult to assemble small articles in a fixture quickly and this naturally tends to lower the speed of production.

Accordingly, it has been a broad objective of the present inventor to provide a fixture for holding a plurality of parts to be treated, such as piston rings, in such a manner that the above difficulties are overcome.

More specifically, it has been an objective of the present inventor to provide a fixture which is extremely simple to manipulate, and which includes means aiding in the assembly of the parts in the fixture and which, after the parts have been assembled, is capable of holding the parts in rigidly clamped position by means of relatively few operating parts. In other words, the fixture is so constituted that those parts aiding in the assembly of the rings can be quickly shed from the clamping fixture before the batch of rings is subjected to heat treatment.

More specifically, it has been a further objective of the present inventor to provide a heat treatment fixture of this nature in which the articles to be subjected to the heat treatment are under constant pressure, with the clamping element so arranged that there is comparatively little obstruction to the surfaces of the parts, particularly the external and internal surfaces in the case of piston rings.

One embodiment in which the invention may take form is that of a device which includes assembly parts for stacking the rings and axially aligning the same, and which includes another set of parts which serves to clamp the rings in flat position under pressure, and by means of which the stacked and rigidly held parts may be heat treated as a unit.

Further objects and advantages will be more fully apparent from a description of the accompanying drawing, in which:

Figure 1 is a sectional view taken through the center of the device, showing the assembly and gripping parts in operating position.

Figure 2 is a top plan view of Figure 1.

Figure 3 is a sectional view taken through a modified form of fixture, showing the fixture removed from the ring assembly parts and ready for treatment of the parts as a unit.

Figure 4 is a top plan view of Figure 3.

Referring to the drawing, an assembly table is indicated at 5. This table includes a cylindrical opening 6 constituted by a sleeve 7 depending integrally from the table. A washer 8 lies in a countersunk portion 9 of the recess. A centering tool 10 is provided and has a portion slidably engageable in the cylindrical opening 6, and a reduced diameter portion 11 projected upwardly, adapted to receive the rings. This tool, therefore, has the function of centering or axially aligning the rings by contact with the inner surfaces thereof.

The rings 12 which are to be treated are stacked around the extension 11 and lie upon the washer 8. A sleeve 13 is then engaged externally over the stacked rings and includes a support flange 14, engaging the top of the table around the cylindrical opening. Thus, the rings are assembled between two elements and this places them in perfect alignment both internally and externally. It will be understood that this is useful in connection with piston rings which are usually split and may therefore tend to spread outwardly so that their external cylindrical surfaces will not be in alignment.

A washer 15 is engaged upon the top of the stack of rings and is held down against the rings by means of clamping fingers 16—16. These clamping fingers are pivotally mounted on clamping screws 17 disposed in the top of standards 18 rising from the table. Wing nuts 19 on the screws clamp the fingers between the bifurcated arms 20 of the standards. When the fingers are not in use, they assume the position shown in dot and dash lines in Figure 1. As shown in full lines they are in use, and the wing nuts have been tightened to hold the fingers down against the washer 15.

With the rings thus held in firmly clamped, stacked position, the cylindrical tool 11 is withdrawn from the bottom of the opening in the table and the normal clamping parts for holding the stack of rings are brought into play.

A washer 21 is engaged through the opening 6 against the bottom of the washer 8. A draw bolt 22 has a head 23 engaging the bottom of the washer 21 and projects axially upwardly to the top of the stack. A retainer element 24, having a circular lower edge engaging the top of the ring or washer 15, is held thereagainst by means of a coil spring 25 under compression about the draw rod between the top of the retainer and a wing nut 26 screwed on the upper end of the rod. The wing nut is screwed down until the spring receives a predetermined pressure. Thereupon, the wing nuts 19 are loosened and the clamping fingers 16 are moved upwardly. The external sleeve 13 is held down and the stacked rings held between the rings or washers 8 and 15 are lifted bodily, or as a unit, from the assembly parts. Thus, a multiplicity of the rings are tightly gripped in the fixture under pressure and are ready for heat treatment in a salt bath such as cyanide potassium, or the like.

When the fixture is deposited in the salt bath it is lowered so that the level of the solution is slightly over the washer 15, thereby leaving the spring above the treatment. Accordingly, its temper will not be destroyed and it will always hold the rings under pressure during the treatment. This same operation is utilized when the fixture is submerged, for drawing the parts, in an oil bath.

In Figure 3, another form of the invention is disclosed. In this form the rings are stacked about a cylinder or sleeve 30. The sleeve 30 includes a flange 31 providing a shoulder at its base. A washer or ring 32 rests upon the flange 31 and a multiplicity of rings are stacked upon the ring 32 about the sleeve. Another washer or ring 33 is mounted upon the top of the uppermost ring and is held thereagainst by means of a retainer 34 of inverted cup shape. The lower peripheral edge of the element 34 is engaged with the top of the ring 33. A clamping screw or draw bolt 35 is connected to the upper wall 36 of the cylindrical sleeve 30. The bolt includes a head 37 engaging the inside of the wall 36 and projects through an opening in the retainer 34. A wing nut 38 is screwed thereon, compressing a spring 39 against the top of the retainer. Thus, the sleeve 30 is drawn upwardly and the retainer 34 is forced downwardly. This results in a spring pressed clamping action on the stack of rings. The sleeve 30 is perforated, as at 40, to provide a multiplicity of openings through which the liquid may flow during the heating and drawing operations.

This device is immersed in the same manner as that shown in Figure 1. If desirable, the springs may be replaced with metallic weights.

Having described my invention, I claim:

A fixture for holding a multiplicity of rings in aligned, stacked, and clamped position for heat treatment, comprising a perforated cylindrical sleeve adapted to support and align the rings internally, said sleeve being open at one end and having an attaching portion across its other end, jaw means extending exteriorly around the open end of the sleeve for engaging one end of the stack of rings, jaw means at the other end of the sleeve, comprising a disc and a flange around said disc telescoping said sleeve and adapted to engage the other end of the stack of rings, a bolt extending through said attaching portion and said disc with the threaded portion thereof extending outwardly, a nut on said threaded portion, and a spring between the nut and the disc for placing said rings under constant compression for allowing expansion and contraction during heat treatment.

VICTOR F. ZAHODIAKIN.